United States Patent
Hwang et al.

(10) Patent No.: US 8,451,510 B2
(45) Date of Patent: May 28, 2013

(54) IMAGE PROCESSING APPARATUS AND IMAGE PROCESSING METHOD THEREOF

(75) Inventors: Tae-yoon Hwang, Suwon-si (KR); Yousun Bang, Seoul (KR); Charles A. Bouman, West Lafayette, IN (US); Eri Haneda, West Lafayette, IN (US)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 537 days.

(21) Appl. No.: 12/489,580

(22) Filed: Jun. 23, 2009

(65) Prior Publication Data

US 2009/0323129 A1 Dec. 31, 2009

(30) Foreign Application Priority Data

Jun. 30, 2008 (KR) ........................ 10-2008-0062784

(51) Int. Cl.
*H04N 1/40* (2006.01)
*H04N 1/04* (2006.01)
*H04N 1/46* (2006.01)
*H04N 1/387* (2006.01)
*H04N 5/14* (2006.01)
*H04N 7/18* (2006.01)
*H04N 9/04* (2006.01)
*G03F 3/10* (2006.01)
*G03B 27/42* (2006.01)
*G03B 27/72* (2006.01)
*G06K 9/20* (2006.01)

(52) U.S. Cl.
USPC ........... 358/448; 358/527; 358/486; 358/445; 358/540; 358/453; 348/268; 348/26; 348/135; 382/283; 355/53; 355/71

(58) Field of Classification Search
USPC 358/527, 448, 1.18, 3.28, 474, 487; 382/254, 382/276, 173; 348/311
See application file for complete search history.

(56) References Cited

U.S. PATENT DOCUMENTS

| 5,781,665 | A | 7/1998 | Cullen et al. |
| 5,880,858 | A * | 3/1999 | Jin .............................. 358/487 |
| 2005/0094902 | A1 | 5/2005 | Zhang et al. |
| 2007/0013980 | A1 | 1/2007 | van Os et al. |
| 2009/0080773 | A1* | 3/2009 | Shaw et al. ................... 382/173 |

FOREIGN PATENT DOCUMENTS

| CN | 1393798 | 1/2003 |
| CN | 1471302 | 1/2004 |
| CN | 1543185 | 11/2004 |

OTHER PUBLICATIONS

Korean Office Action Issued on Aug. 1, 2012 in KR Patent Application No. 10-2008-0062784.
Chinese Office Action dated Jan. 4, 2013 issued in CN Application No. 200910143677.X.

* cited by examiner

*Primary Examiner* — Charlotte M Baker
*Assistant Examiner* — Rury Grisham
(74) *Attorney, Agent, or Firm* — Stanzione & Kim, LLP

(57) ABSTRACT

An image processing method of an image processing apparatus, the method includes: discerning pixels to be processed on the basis of a preset reference pixel value in a scanned image that comprises plural pixels; drawing a pixel area including the pixels to be processed from the scanned image on the basis of a preset condition; and selecting whether to apply an image process to the pixels to be processed or the drawn pixel area on the basis of a percentage of the pixels to be processed in the drawn pixel area.

18 Claims, 7 Drawing Sheets

IMAGE PROCESSING APPARATUS AND IMAGE PROCESSING METHOD THEREOF

CROSS-REFERENCE TO RELATED APPLICATIONS

This application claims priority from Korean Patent Application No. 10-2008-0062784, filed on Jun. 30, 2008 in the Korean Intellectual Property Office, the disclosure of which is incorporated herein by reference.

BACKGROUND OF THE INVENTION

1. Field of the Invention

Apparatuses and methods consistent with the present general inventive concept relate to an image processing apparatus of getting a scanned image and an image processing method thereof, and more particularly to an image processing apparatus and an image processing method thereof, in which a loss of image information is minimized when getting a scanned image.

2. Description of the Related Art

An image processing apparatus scans an object to get an image of the object, which can be generally achieved by a scanner.

The scanner includes a transparent plate on which a predetermined object is placed upon, and a scanning unit which gets a scanned image of the object by scanning the object while moving under the transparent plate. Here, the scanner is connected to a host such as a computer or the like, and transmits the scanned image to the host.

Further, since the scanning unit projects a light beam on the object to get the scanned image, the scanner includes a cover for covering both the transparent plate and the object to prevent the light beam from leaking out.

Conventionally, the scanner gets a primary scanned image from an object and then removes a part unrelated to the object from the primary scanned image, thereby forming a final scanned image to be transmitted to the host. That is, the primary scanned image includes an image area corresponding to the object and an image area corresponding not to the object but a rear of the cover, so that the final scanned image can be formed by taking only the image area corresponding to the object from the primary scanned image.

However, if the primary scanned image is taken while the object is covered with the cover, the image area corresponding to the rear of the cover is generally scanned as white. Therefore, in the case where the object is white paper, the image area corresponding to the object is not distinctive from the image area corresponding to the rear of the cover in the primary scanned image.

Accordingly, an image area smaller than an actual image area may be scanned due to the indistinctiveness even when needing to get the image area corresponding to only the object from the primary scanned image. In other words, there is a problem that image information of the object may be lost in the final scanned image.

SUMMARY OF THE INVENTION

The present general inventive concept may provide an image processing apparatus and an image processing method thereof, in which a loss of image information in a final scanned image is minimized when scanning an object and selectively taking an actual image area.

The present general inventive concept may also provide a display apparatus reduced in cost and capable of sensing an external stimulus, and a control method thereof.

Additional aspects and utilities of the present general inventive concept will be set forth in part in the description which follows and, in part, will be obvious from the description, or may be learned by practice of the general inventive concept.

Embodiments of the present general inventive concept can be achieved by providing an image processing method of an image processing apparatus, the method may include: discerning pixels to be processed on the basis of a preset reference pixel value in a scanned image that includes a plurality of pixels; drawing a pixel area including the pixels to be processed from the scanned image on the basis of a preset condition; and selecting whether to apply an image process to the pixels to be processed or the drawn pixel area on the basis of a percentage of the pixels to be processed in the drawn pixel area.

Selecting whether to apply an image process to the pixels to be processed or the drawn pixel area may include comparing a function Y satisfying the following expression with a preset value, and selecting the pixels to be processed if the Y is less than or equal to the preset value, and the drawn pixel area if the Y is more than the preset value, $$Y=\{(Cp-Rp)/Cp\}*100[\%] \qquad \text{<Expression 1>}$$

where, Cp indicates the number of pixels in the drawn pixel area, and Rp indicates the number of pixels to be processed.

Drawing the pixel area may include drawing a pixel area within a polygon formed by a convex hull algorithm.

Drawing the pixel area within the polygon may include forming the polygon with outmost pixels among the pixels to be processed.

Forming the polygon may include: forming an octagon including the pixels to be processed thereinside; and drawing the polygon formed by lines at positions where the lines are first in contact with the pixels to be processed, while making the lines constituting the octagon approach a center of the octagon.

Discerning the pixels to be processed may include selecting pixels corresponding to an area scanned unrelated to the object in the scanned image, and designating a pixel value of the selected pixel as the reference pixel value.

Selecting pixels corresponding to an area scanned unrelated to the object in the scanned image may include selecting at least one pixel among the pixels positioned at edges of the scan image.

Discerning the pixels to be processed may include discerning the pixels in order of being adjacent to the selected pixel among the plurality of pixels of the scanned image.

Embodiments of the present general inventive concept can also be achieved by providing an image processing apparatus including: a scanning unit which scans an object and outputs a scanned image; and an image processing unit which discerns pixels to be processed on the basis of a preset reference pixel value in the scanned image that includes a plurality of pixels, draws a pixel area including the pixels to be processed from the scanned image on the basis of a preset condition, selects the pixels to be processed or the drawn pixel area on the basis of a percentage of the pixels to be processed in the drawn pixel area, and applies an image process to the scanned image according to results of the selection.

The image processing unit may compare a function Y satisfying the following expression with a preset value, and selects the pixels to be processed if the Y is less than or equal to the preset value, and the drawn pixel area if the Y is more than the preset value, $$Y=\{(Cp-Rp)/Cp\}*100[\%]  \qquad <\text{Expression 2}>$$

where, Cp indicates the number of pixels in the drawn pixel area, and Rp indicates the number of pixels to be processed.

The image processing unit may draw the pixel area depending on a polygon formed by a convex hull algorithm.

The image processing unit may form the polygon with outmost pixels among the pixels to be processed.

The image processing unit may form an octagon including the pixels to be processed thereinside; making lines constituting the octagon approach a center of the octagon; and draws the polygon formed by the lines at positions where the lines are first in contact with the pixels to be processed.

The image processing unit may select pixels corresponding to an area scanned unrelated to the object in the scanned image, and may designate a pixel value of the selected pixel as the reference pixel value.

The image processing unit may select at least one pixel among the pixels positioned at edges of the scanned image.

The image processing unit may discern the pixels in order of being adjacent to the selected pixel among the plurality of pixels of the scanned image.

Embodiments of the present general inventive concept may further comprise of an image processing method comprising: generating a binary mask of pixels including pixels to be processed and pixels not to be processed; comparing a pixel value of each pixel with a preset pixel value; and determining if pixel value is beyond a preset range, the pixel is determined to be processed, otherwise if the pixel value of the pixel is within the preset range, the pixel is determined not to be processed.

BRIEF DESCRIPTION OF THE DRAWINGS

Embodiments of the present general inventive concept will become apparent and more readily appreciated from the following description of the exemplary embodiments, taken in conjunction with the accompanying drawings, in which.

DETAILED DESCRIPTION OF THE PREFERRED EMBODIMENTS

Figure 1:
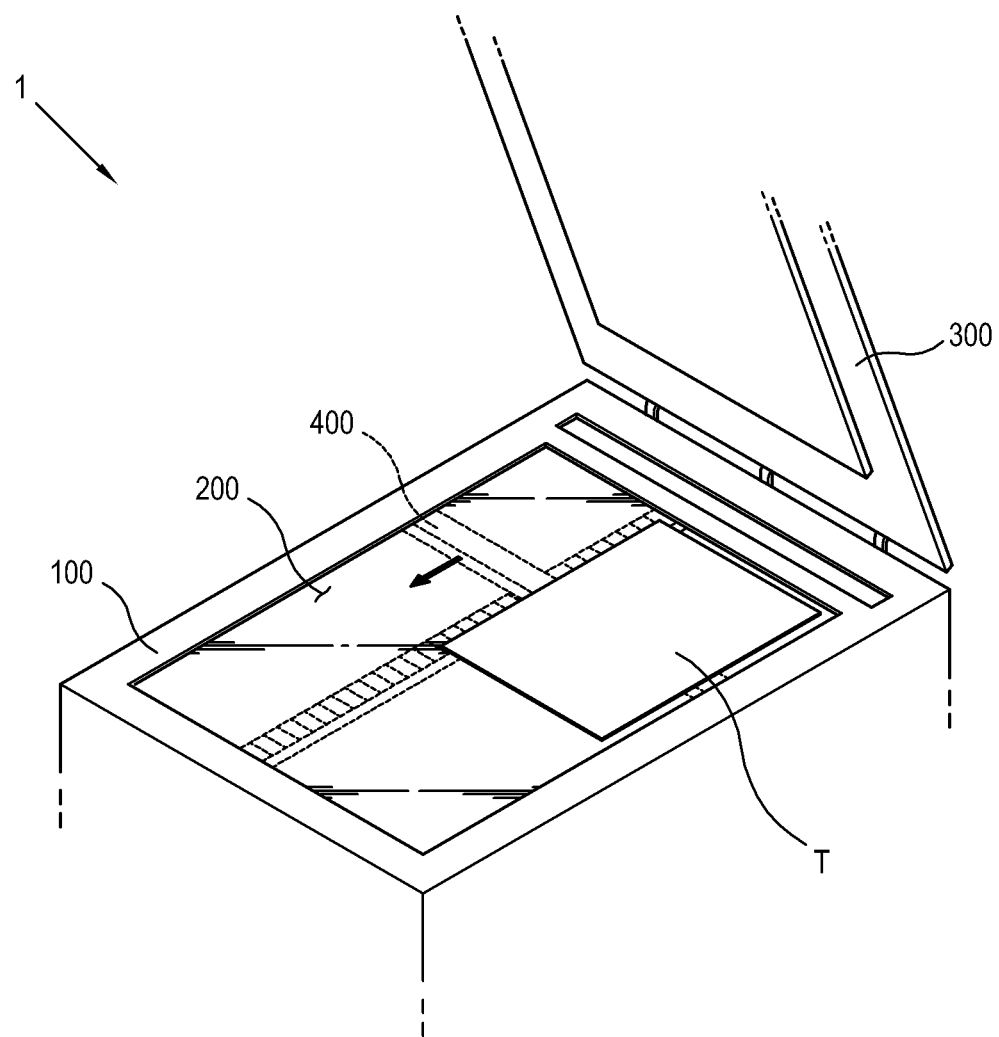
FIG. 1 is a perspective view of a scanner according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
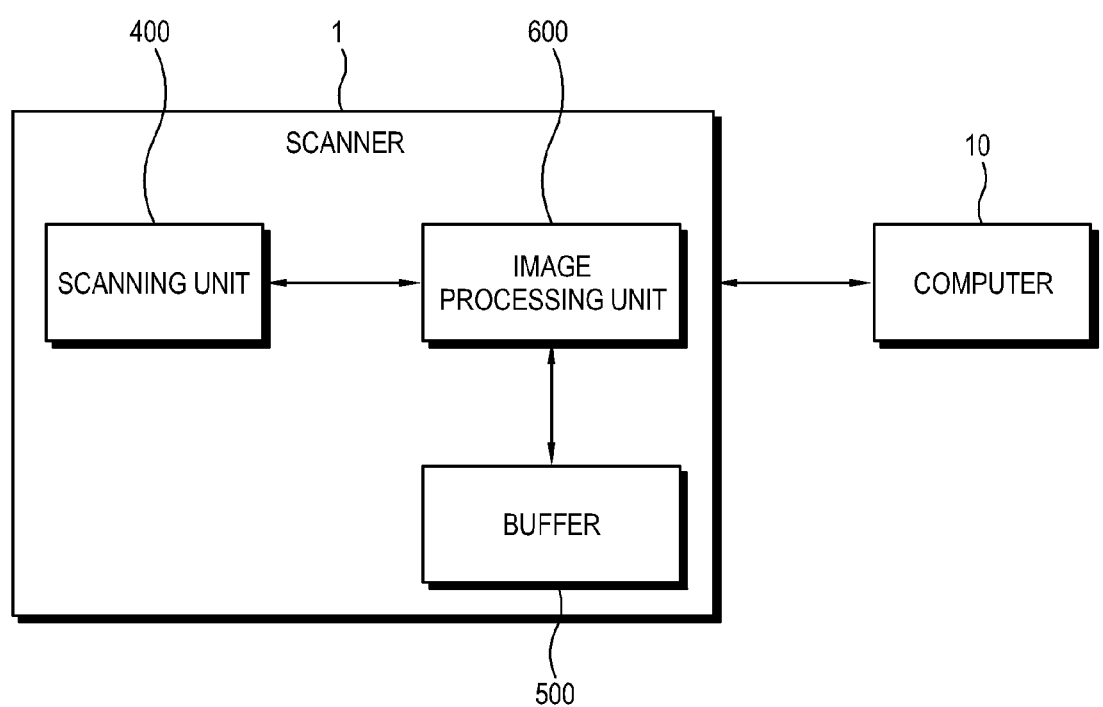
FIG. 2 is a control block diagram of the scanner in FIG. 1.

FIG. 1 is a perspective view of a scanner according to an embodiment of the present general inventive concept, and FIG. 2 is a control block diagram of the scanner in FIG. 1. In this embodiment, the scanner 1 is employed as an image processing apparatus 1, but this does not limit the spirit of the present general inventive concept. Alternatively, any of devices that can scan and process an image, e.g., a multi-function peripheral, may be used as the image processing apparatus 1.

As shown in FIGS. 1 and 2, the scanner 1 according to the present embodiment may generate a scanned image by scanning an object T, and may process the scanned image through various methods to thereby transmit a final scanned image to a computer 10. The computer 10 may store the final scanned image received from the scanner 1 so that a user can process the final scanned image. Further, the computer 10 may transmit a control signal corresponding to a user's manipulation to the scanner 1, thereby controlling an operation of the scanner 1.

In this embodiment, the scanner 1 may include the following elements, but is not limited thereto. The scanner 1 may include a scanning unit 400 to scan the object T and generate the scanned image, and an image processing unit 600 to process the scanned image and generate the final scanned image.

Further, the scanner 1 may include a casing 100 forming an outer appearance, a transparent plate 200 provided on an upper side of the casing 100, a cover 300 to cover or open the transparent plate 200, and a buffer 500 to temporarily store the scanned image from the scanning unit 400, a binary mask (to be described later, but not shown) formed by the image processing unit 600, etc.

The elements of the scanner 1 will be described in more detail below.

As shown in FIG. 1, the transparent plate 200 may be placed in an upper plate of the casing 100 so that the object T is loaded or seated. At this time, the object T may be placed so that one side thereof to be scanned can face toward the transparent plate 200. Further, the scanning unit 400 may be placed under the transparent plate 200 and may project a light beam on the object T to get the scanned image. Here, the transparent plate 200 needs greater transparency to prevent a scanning error due to distortion caused when the transparent plate 200 transmits the light beam.

The cover 300 may cover the upper plate of the casing 100 having the transparent plate 200 so that the light beam projected from the scanning unit 400 can be prevented from leaking out of the scanner 1, thereby preventing a scanning error with regard to the object T. The cover 300 may have a rear, i.e., a side facing the transparent plate 200, to reflect the light beam emitted from the scanning unit 400 back to the scanning unit 400.

The rear of the cover 300 may be white to effectively reflect the light beam of the scanning unit 400, but the color of the rear is not limited thereto.

The scanning unit 400 may be placed under the transparent plate 200 inside the casing 100, and movable along a surface of the transparent plate 200. The scanning unit 400 may move while projecting the light beam upon the object T put on the transparent plate 200 and receiving the projected light beam to get the scanned image of the object T.

As shown in FIG. 2, the scanning unit 400 may scan the object T and output a primary scanned image to the image processing unit 600. This scanned image is formed as a plurality of pixels each having a pixel value are arranged in rows and columns.

The image processing unit 600 processes the scanned image output from the scanning unit 400 and generates the final scanned image. The image processing unit 600 may be achieved by hardware such as a chipset, an integrated circuit, etc. or software such as a program, etc.

The buffer 500 may temporarily store various temporary data generated during the scanning process. For example, the buffer 500 may temporarily store the scanned image output from the scanning unit 400, the binary mask (not shown) generated by the image processing unit 600, and the final scanned image to be transmitted to the computer 10. Such data stored in the buffer 500 may be deleted by the image processing unit 600 when the scanning process is completed and the data becomes useless.

The image processing unit 600 may perform a primary analysis process to discern between a pixel to be processed and a pixel not to be processed on the basis of a preset pixel value with respect to the scanned image output from the scanning unit 400. Further, the image processing unit 600 may perform a secondary analysis process to draw a pixel area including the pixels to be processed from the scanned image according to a previously given condition. Also, the image processing unit 600 performs a tertiary analysis process to select the drawn pixel area or the pixels to be processed in the scan image. The image processing unit 600 may apply an image process to the selected pixels and thus takes the final scanned image to be transmitted to the computer 10.

Through the foregoing processes of the image processing unit 600, an image area corresponding to the object T may be efficiently taken by removing an image area corresponding to the rear of the cover from the primary scanned image of the scanning unit 400 when the image area corresponding to the object T is not distinctive from an image area corresponding to the rear of the cover in the primary scanned image from the scanning unit 400. That is, a loss of image information about the object T may be minimized when removing the image area corresponding to the rear of the cover 300.

Specifically, the pixel area of the secondary analysis process may contain more pixels than the pixels to be processed of the primary analysis process, i.e., may contain the pixels not to be processed adjacent to the pixels to be processed in addition to the pixels to be processed. In the tertiary analysis process, a result from the primary analysis process and a result from the secondary analysis process are compared with each other. If the result of the primary analysis process shows that a loss of actual image information is great, the image process may be applied to the pixels to be processed. Otherwise, the image process may be applied to the pixel area of the secondary analysis process where a loss of image information is relatively not much.

Below, exemplary embodiments of the respective analysis processes performed by the image processing unit 600 will be described with reference to FIGS. 4 through 7.

Figure 4:
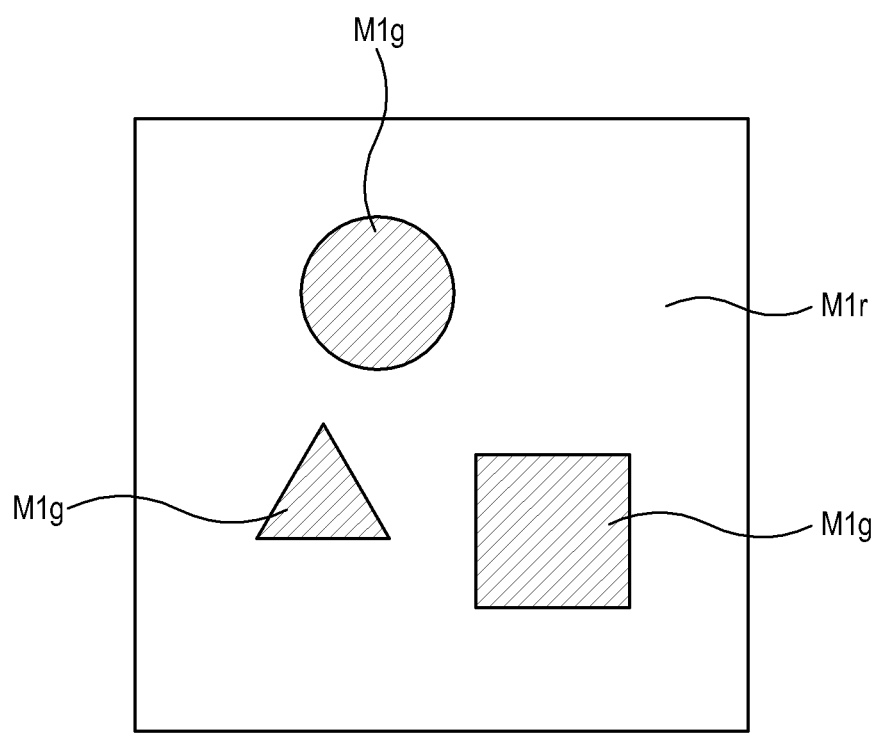
FIG. 4 is an exemplary view of a first binary mask based on the scanner control method of FIG. 3.

FIG. 4 is an exemplary view of a first binary mask generated through the primary analysis process of the image processing unit 600. Here, the binary mask refers to a mask of pixels represented with two values of 0 and 1.

As shown in FIG. 4, the image processing unit 600 may discern the pixels of the scanned image output from the scanning unit 400 and thus may generate the first binary mask. The first binary mask may include the pixels M1g to be processed and the pixels M1r not to be processed. In FIG. 4, the pixels are not individually shown and an area where the pixels are grouped is shown for clarity.

To discern the pixels of the scanned image, the image processing unit 600 may compare a pixel value of each pixel with a preset pixel value. If the pixel value of the pixel is beyond a preset range, the pixel is determined as to be processed. On the other hand, if the pixel value of the pixel is within the preset range, the pixel is determined as not to be processed. Here, a region of discerning the plurality of pixels may be narrowed down from edges of the scanned image, which are more likely to have the pixels not to be processed, toward a center of the scanned image. However, order of discerning the pixels may not be limited thereto.

The preset pixel value and the preset range may be varied and do not limit the spirit of the present invention. The preset pixel value may be set with respect to the pixels of the scanned image excluding those for the object T. For example, the preset pixel value may be a reference pixel value which may be set with respect to the pixels formed when the transparent plate 200 is covered with the cover 300 or the cover 300 is opened. In other words, the reference pixel value may be a pixel value of the pixel corresponding to a part scanned unrelated to the object T in the scanned image, i.e., a pixel value of the pixel excluded when the scanned image is processed to generate the final scanned image.

The image processing unit 600 may designate at least one pixel positioned at the edges of the scanned image as a reference pixel. The reason why the pixel positioned at the edge of the scanned image may be designated as the reference pixel is because the edges are more likely to have the pixels scanned unrelated to the object T. Thus, the image processing unit 600 may select the reference pixel and consider the pixel value of the reference pixel as the reference pixel value, thereby setting the reference pixel value without sensing whether the cover 300 is closed or opened.

Here, the reference pixel value may correspond to white when the cover 300 is closed, and black when the cover 300 is opened, but not limited thereto. Even though the pixel value of the scanned image differs according to characteristics of various scanners 1, the image processing unit 600 may set the reference pixel value corresponding to the characteristic of each scanner 1 with the foregoing configuration.

The image processing unit 600 may discern whether the pixels are to be processed or not to be processed with respect to the plurality of pixels constituting the scanned image in order of being adjacent to the reference pixel set as described above.

In the case where the scanning is performed while the cover 300 is closed, if the pixel value of the pixel is within the preset range, it may be determined that the pixel approximates to white and is not to be processed. On the other hand, if the pixel value is beyond the preset range, it may be determined that the pixel is not white and to be processed. When the foregoing determination is completed with respect to every pixel, the first binary mask may be formed as shown in FIG. 4.

Here, the pixel values may be compared by various methods. For example, one pixel may be designated as the reference pixel, and four-directional, i.e., up, down, left and right pixels adjacent to the reference pixel are each compared with the reference pixel to be discerned. Repetitively, the discernment-completed pixels may be designated again as the reference pixel, and an undiscerned pixel among its four-directional adjacent pixels undergoes the comparison and the discernment.

A pixel to be discerned and the reference pixel may be compared in the pixel value by an <Expression 1>. However, this expression is nothing but an exemplary embodiment, and alternatively there may be various comparing methods.

$$(Rr-Rc)^2+(Gr-Gc)^2+(Br-Bc)^2 \leq Thres \qquad \text{<Expression 1>}$$

where, the meaning of each variable is as follows.

Rr, Gr and Br: color values of red, green and blue in the reference pixel

Rc, Gc and Bc: color values of red, green and blue in a pixel to be discerned

Thres: the preset range

The color values are represented by numerals from 0 to 255 with regard to each of red, green and blue. For example, white has color values of 255, 255, 255 with regard to R, G and B, respectively, and likewise black has color values of 0, 0, 0. Further, the Thres is not constant and may be variable according to diverse conditions, i.e., according to conditions of the scanner 1.

That is, the <Expression 1> may be used to discern whether a difference between the pixel to be discerned and the reference pixel is not more than the Thres. Specifically, if the left side of the <Expression 1> is less than or equal to the Thres, it is determined that the pixel to be discerned and the reference pixel have similar pixel values. If the left side of the <Expression 1> is more than the Thres, it is determined that they have different pixel values.

Figure 5:
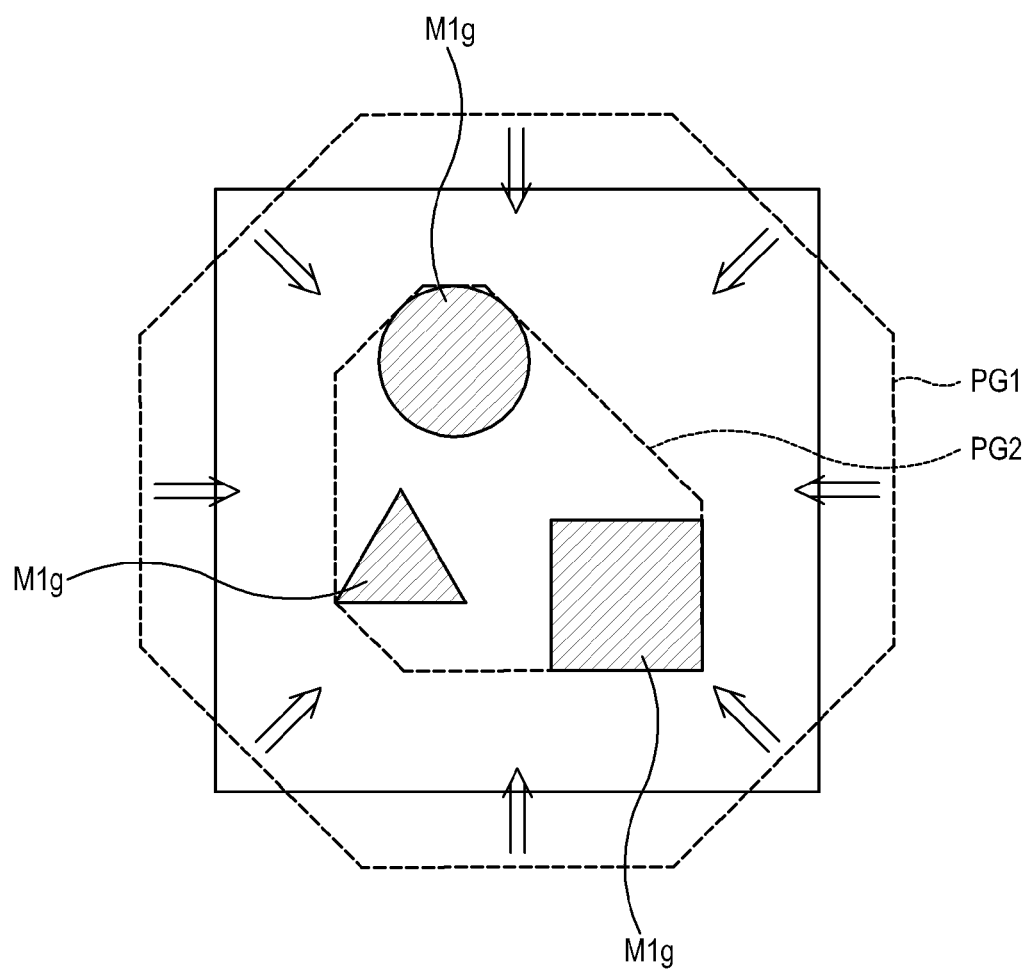
FIG. 5 is an exemplary view of forming a second binary mask in the scanner control method of FIG. 3.
Figure 6:
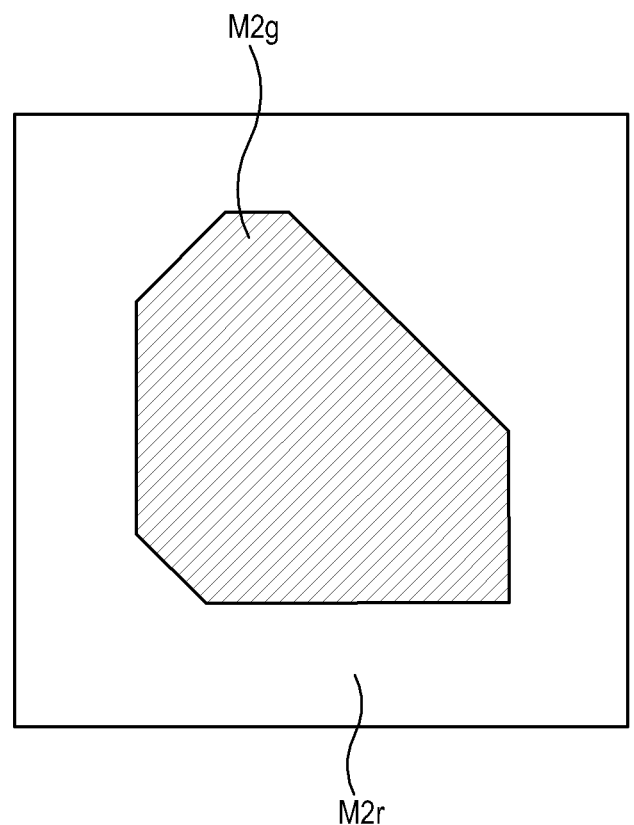
FIG. 6 is an exemplary view of the second binary mask based on the forming method of FIG. 5.

FIG. 5 is an exemplary view of forming a second binary mask generated through the secondary analysis process of the image processing unit 600; and FIG. 6 is an exemplary view of the second binary mask.

As shown in FIG. 5, if the first binary mask is generated through the primary analysis process, the image processing unit 600 draws the pixel area including the pixels (to be processed) M1g according to a previously given condition. The condition to draw the pixel area may be variously given. In this embodiment, a method based on a convex hull algorithm will be used.

The convex hull algorithm, one of mathematical algorithms, is a method for discerning outmost points when there are plural points, and forming a polygon that includes all of the plural points. In the following embodiment, a method of drawing the pixel area on the basis of the convex hull algorithm will be described. The convex hull algorithm is nothing but an exemplary embodiment, and thus does not limit the spirit of the present invention.

The image processing unit 600 may form a random polygon, e.g., an octagon that includes the pixels M1g of the first binary mask. Here, the number of lines constituting the polygon do not have a limit. The more the lines, the higher the accuracy. However, the more the lines, the more the processes are needed.

The image processing unit 600 may make eight lines constituting the octagon PG1 approach the center of the octagon PG1. That is, each line moves in parallel while narrowing the area of the octagon PG1. The lines are stopped sequentially in order of coming into contact with the pixels M1g to be processed.

When all lines are stopped as being in contact with the outmost pixels among the pixels M1g to be processed, a new polygon PG2 including all pixels M1g to be processed may be formed.

Thus, as shown in FIG. 6, a second binary mask may be generated while including a pixel area M2g formed by the pixels inside the new polygon PG2 of FIG. 5 and an area M2r formed by the pixels surrounding the pixel area M2g.

The pixel area M2g of the second binary mask may include all pixels M1g to be processed, and may not include any pixel M1r not to be processed or includes some pixels M1r. Thus, the number of pixels in the pixel area M2g may be equal to or greater than that of the pixels M1g to be processed. In other words, the second binary mask may contain more image information than the first binary mask, in generating the final scanned image.

Figure 3:
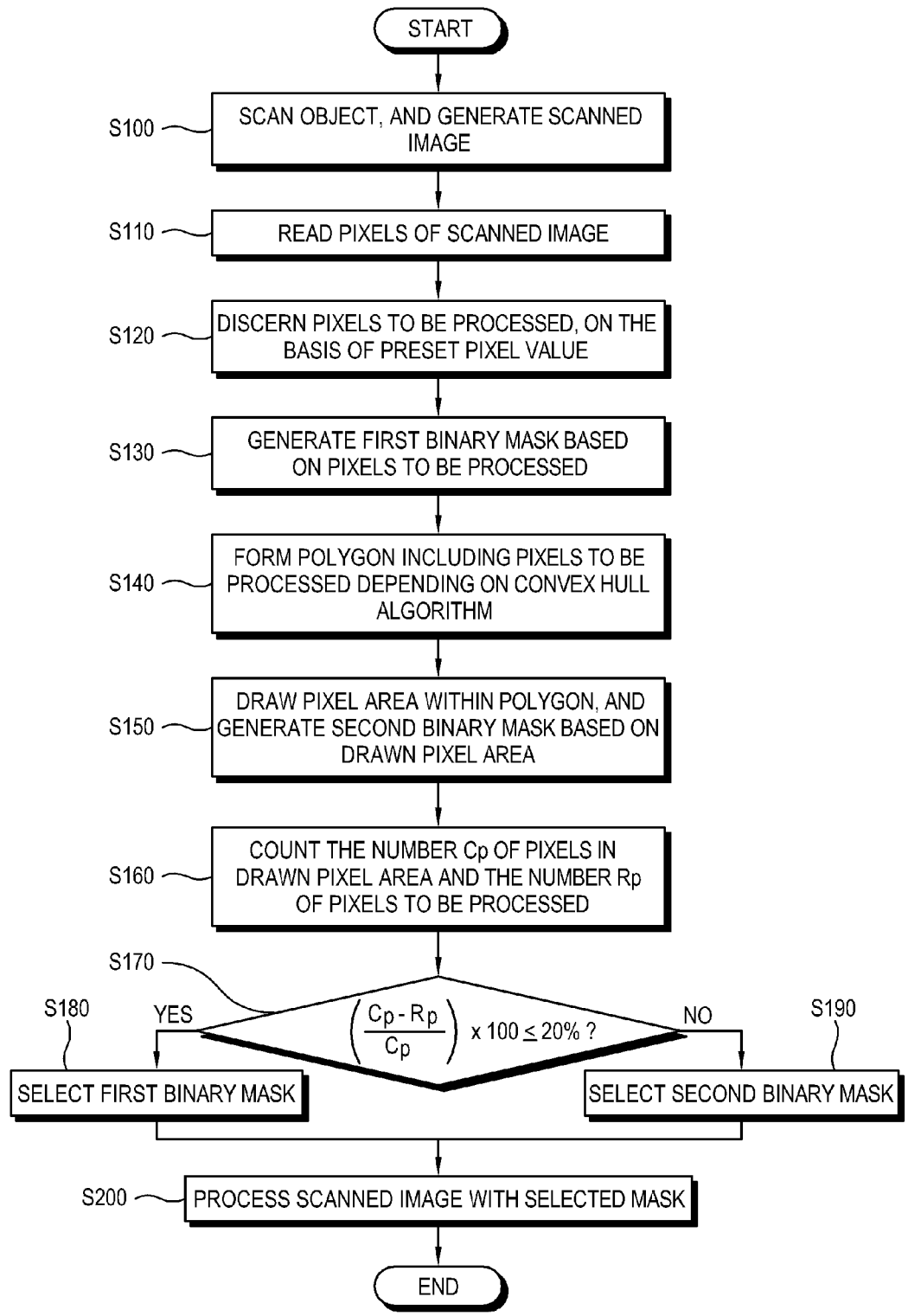
FIG. 3 is a flowchart showing a control method for the scanner of FIG. 1.
Figure 7:
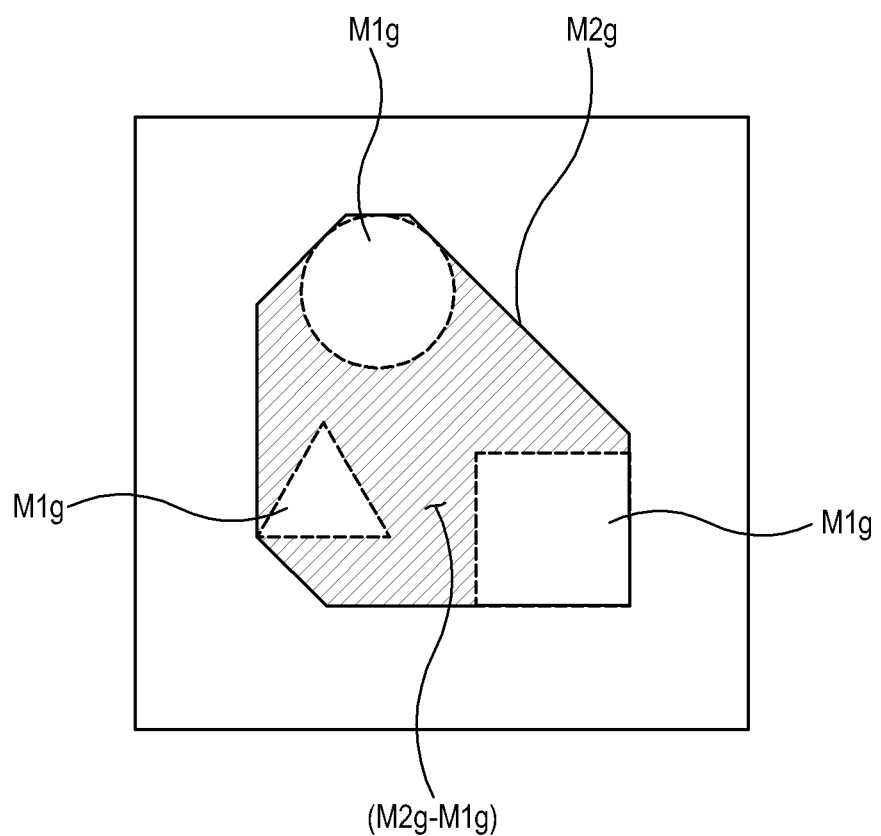
FIG. 7 is an exemplary view of showing that the first binary mask and the second binary mask are overlapped by the scanner control method of FIG. 3.

FIG. 7 is an exemplary view of showing that the first binary mask and the second binary mask are overlapped by the scanner control method of FIG. 3.

As shown in FIG. 7, the image processing unit 600 may compare the first and second binary masks during the tertiary analysis process. Referring to FIG. 7, since the pixels M1g may be processed belong to the pixel area M2g, the pixels M1g may be processed forming an intersection area and the other pixels form a complement area (M2g−M1g).

The complement area (M2g−M1g) may be equivalent to an area of the first binary mask which is determined as including the pixels M1r not to be scanned.

The image processing unit 600 may determine whether to select the first binary mask or the second binary mask on the basis of an <Expression 2>.

$$Y=\{(Cp-Rp)/Cp\}*100[\%] \qquad \text{<Expression 2>}$$

where, the meaning of each variable is as follows.

Cp: the number of pixels in the pixel area M2g

Rp: the number of pixels M1g to be processed

Here, (Cp−Rp) means the number of pixels in the complement area (M2g−M1g). Thus, Y represents how much the pixels of the complement area (M2g−M1g) occupy the pixel area M2g.

The image processing unit 600 may determine that the pixels M1g to be processed are properly discerned if Y is less than or equal to the preset value, i.e., that there is little loss of the image information in the first binary mask. Accordingly, the image processing unit 600 may select the first binary mask to apply the image process to the pixels M1g to be processed.

On the other hand, the image processing unit 600 may determine that the pixels M1g to be processed are improperly discerned if Y is more than the preset value, i.e., that there is much loss of the image information in the first binary mask. Accordingly, the image processing unit 600 may select the second binary mask to apply the image process to the pixel area M2g so that the loss of the image information can be compensated.

The foregoing preset value may be variously set depending on experimental data of the scanner 1, and thus does not limit the present general inventive concept. For example, the preset value may be set as about 20% in the case of generating the second binary mask.

With the above configurations and processes, a method of drawing the final scanned image of the object T in the scanner 1 according to an embodiment of the present general inventive concept will be described below with reference to FIG. 3.

FIG. 3 is a control flowchart of the scanner 1 according to an embodiment of the present invention.

Referring to FIG. 3, the scanning unit 400 may scan the object T on the transparent plate 200 and generate the scanned image (operation S100). The image processing unit 600 may read the pixels of the generated scanned image (operation S110).

With respect to the preset pixel value, the image processing unit 600 may discern between the pixels M1g to be processed and the pixel M1r not to be processed in the pixels constituting the scanned image (operation S120). Further, the image processing unit 600 may generate the first binary mask based on the pixels M1g to be processed (operation S130) (see to FIG. 4).

After the first binary mask is generated, the image processing unit 600 may form the polygon PG2, which contains the pixels M1g to be processed, on the basis of the convex hull algorithm (operation S140). The image processing unit 600 may draw the pixel area M2g from the polygon PG2, and generate the second binary mask based on the pixel area M2g (operation S150) (see FIGS. 5 and 6).

The image processing unit 600 may count the number Cp of pixels in the drawn pixel area M2g and the number Rp of the pixels M1g to be processed (operation S160), and determine whether a percentage of {(Cp−Rp)/Cp} is less than or equal to the preset value, e.g., 20% (operation S170).

If the percentage of {(Cp−Rp)/Cp} is less than or equal to 20%, the image processing unit 600 may determine that the pixels M1g to be processed are properly discerned, and thus select the first binary mask (operation S180). On the other hand, if the percentage of {(Cp−Rp)/Cp} is more than 20%, the image processing unit 600 may determine that the pixels M1g to be processed are improperly discerned and there is much loss of the image information when processed by the first binary mask, and thus select the second binary mask (operation S190).

When one of the binary masks is selected as described above, the image processing unit 600 may process the scanned image on the basis of the selected binary mask, thereby generating the final scanned image (operation S200). The final scanned image may be stored in a memory (not show) provided in the scanner 1 or transmitted from the scanner 1 to the computer 10. When the foregoing processes are completed, the image processing unit 600 may initialize the buffer 500 and prepare the next process.

As described above, the binary masks formed by the foregoing processes may be selectively applied to the scanned image to generate the final scanned image, so that a data size of the final scanned image can be decreased and a loss of the image information can be minimized.

Meanwhile, the scanner 1 may be provided alone in the above embodiment, but not limited thereto. Alternatively, the scanner 1 may be provided together with an image forming apparatus (not shown) for forming an image on a print medium, which can be achieved by a multi-function peripheral (not shown) capable of scanning an image and forming the image on the print medium.

According to embodiments of the present general inventive concept, pixels to be processed and a pixel area to be processed are drawn from a primarily scanned image on the basis of a preset pixel value and a preset condition, and one of them is selected according to an occupying percentage of the pixels to thereby generate a final scanned image. Thus, even though the pixels not to be processed are excessively generated when discerning the pixels to be processed on the basis of the preset pixel, it can be compensated, thereby preventing the final scanned image from a loss of image information and securing reliability of the final scanned image.

Further, an image area to be finally taken from the scanned image is distinctive from and excludes the other area, thereby reducing a data size of the final scanned image. For example, if an object is white paper and rear of a cover covering the object in the scanner has the same white color, the object and the rear of the cover can be distinctive from each other in the scanned image.

Also, a desired image area can be read by once scanning, so that there is no need of pre-scanning based on a low resolution, which is performed in a conventional scanner before regular scanning based on a setting resolution.

Although a few exemplary embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image processing method of an image processing apparatus, the method comprising:
discerning pixels to be processed on the basis of a preset reference pixel value in a scanned image that comprises a plurality of pixels;
drawing a pixel area including the pixels to be processed from the scanned image on the basis of a preset condition; and
selecting whether to apply an image process to the pixels to be processed or the drawn pixel area on the basis of a percentage of the pixels to be processed in the drawn pixel area,
wherein selecting the pixels to be processed when the percentage is larger than a predetermined value, and selecting the drawn pixel area when the percentage is smaller than a predetermined value.

2. The method according to claim 1, wherein the selecting comprises comparing a function Y satisfying the following expression with a preset value, and selecting the pixels to be processed if the Y is less than or equal to the preset value, and the drawn pixel area if the Y is more than the preset value, $$Y=\{(Cp-Rp)/Cp\}*100[\%] \qquad <\text{Expression 1}>$$

where, Cp indicates the number of pixels in the drawn pixel area, and Rp indicates the number of pixels to be processed.

3. The method according to claim 1, wherein the drawing the pixel area comprises drawing a pixel area within a polygon formed by a convex hull algorithm.

4. The method according to claim 3, wherein the drawing the pixel area within the polygon comprises forming the polygon with outmost pixels among the pixels to be processed.

5. The method according to claim 4, wherein the forming the polygon comprises:
forming an octagon including the pixels to be processed thereinside; and
drawing the polygon formed by lines at positions where the lines are first in contact with the pixels to be processed, while making the lines constituting the octagon approach a center of the octagon.

6. The method according to claim 1, wherein the discerning the pixels to be processed comprises selecting pixels corresponding to an area scanned unrelated to the object in the scanned image, and designating a pixel value of the selected pixel as the reference pixel value.

7. The method according to claim 6, wherein the selecting pixels corresponding to an area scanned unrelated to the object in the scanned image comprises selecting at least one pixel among the pixels positioned at edges of the scanned image.

8. The method according to claim 7, wherein the discerning the pixels to be processed comprises discerning the pixels in order of being adjacent to the selected pixels among the plural pixels of the scanned image.

9. An image processing apparatus comprising:
a scanning unit which scans an object and outputs a scanned image; and
an image processing unit which discerns pixels to be processed on the basis of a preset reference pixel value in the scanned image that comprises a plurality. of pixels, draws a pixel area including the pixels to be processed from the scanned image on the basis of a preset condition, selects the pixels to be processed or the drawn pixel area on the basis of a percentage of the pixels to be processed in the drawn pixel area, and applies an image process to the scanned image according to results of the selection, wherein selecting the pixels to be processed when the percentage is larger than a predetermined value, and selecting the drawn pixel area when the percentage is smaller than a predetermined value.

10. The image processing apparatus according to claim 9, wherein the image processing unit compares a function Y satisfying the following expression with a preset value, and selects the pixels to be processed if the Y is less than or equal to the preset value, and the drawn pixel area if the Y is more than the preset value, $$Y=\{(Cp-Rp)/Cp\}*100[\%] \qquad <\text{Expression 2}>$$

where, Cp indicates the number of pixels in the drawn pixel area, and Rp indicates the number of pixels to be processed.

11. The image processing apparatus according to claim 9, wherein the image processing unit draws the pixel area depending on a polygon formed by a convex hull algorithm.

12. The image processing apparatus according to claim 11, wherein the image processing unit forms the polygon with outmost pixels among the pixels to be processed.

13. The image processing apparatus according to claim 12, wherein the image processing unit forms an octagon including the pixels to be processed thereinside;
    making lines constituting the octagon approach a center of the octagon; and draws the polygon formed by the lines at positions where the lines are first in contact with the pixels to be processed.

14. The image processing apparatus according to claim 9, wherein the image processing unit selects pixels corresponding to an area scanned unrelated to the object in the scanned image, and designates a pixel value of the selected pixel as the reference pixel value.

15. The image processing apparatus according to claim 14, wherein the image processing unit selects at least one pixel among the pixels positioned at edges of the scanned image.

16. The image processing apparatus according to claim 15, wherein the image processing unit discerns the pixels in order of being adjacent to the selected pixel among the plural pixels of the scanned image.

17. An image processing method, comprising:
    generating a first binary mask of pixels including first pixels to be processed and second pixels not to be processed;
    generating a second binary mask of pixel areas including first pixel areas each of which includes at least one pixel among the first pixels and second pixel areas which do not include the first pixels; and
    selecting whether to apply an image process to the first pixels or the first pixel area on the basis of a percentage of the of the first pixel in the first pixel area, wherein selecting the first pixels when the percentage is larger than a predetermined value, and selecting the first pixel area when the percentage is smaller than a predetermined value.

18. The method of claim 17, wherein the preset range of the pixel value of the pixel may be a reference pixel value corresponding to a scanned part unrelated to an object in a scanned image.

* * * * *